United States Patent [19]

Den Hollander et al.

[11] 3,912,761
[45] Oct. 14, 1975

[54] (-)-DI-O-ISOPROPYLIDENE-2-KETO-L-GULONATES

[75] Inventors: Charles William Den Hollander, Midland Park; Willy Leimgruber, Montclair; Ernest Mohacsi, Nutley, all of N.J.

[73] Assignee: Hoffmann-La Roche Inc., Nutley, N.J.

[22] Filed: Sept. 23, 1974

[21] Appl. No.: 508,128

Related U.S. Application Data

[62] Division of Ser. No. 251,134, May 8, 1972, Pat. No. 3,855,227, which is a division of Ser. No. 795,333, Jan. 30, 1969, Pat. No. 3,682,925.

[52] U.S. Cl. ............................................... 260/340.9
[51] Int. Cl.$^2$ ........................................ C07D 317/26
[58] Field of Search ............................... 260/340.9

[56] References Cited
UNITED STATES PATENTS
2,847,421   8/1958   D'Addieco ..................... 260/340.9

*Primary Examiner*—Richard L. Raymond
*Attorney, Agent, or Firm*—Samuel L. Welt; Jon S. Saxe; Raymond R. Wittekind

[57] ABSTRACT

Racemic modifications of optically active amines are treated with (-)-di-O-isopropylidene-2-keto-L-gulonic acid to form diastereomeric salts. The so-formed diastereomeric salts are separated and chemically decomposed to give the desired enantiomers of the amine. The resolving agent, (-)-di-O-isopropylidene-2-keto-L-gulonic acid, is recovered by precipitation from aqueous solution.

5 Claims, No Drawings

(−)-DI-O-ISOPROPYLIDENE-2-KETO-L-GULONATES

This is a division, of application Ser. No. 251,134 filed May 8, 1972, now U.S. Pat. No. 3,855,227 which in turn is a division of U.S. Pat. application Ser. No. 795,333, filed Jan. 30, 1969, now U.S. Pat. No. 3,682,925, issued Aug. 8, 1972.

BACKGROUND OF THE INVENTION

Organic amines which contain a chiral center are usually prepared by synthetic methods which result in a racemic form of the compound. Frequently, biological properties of such compounds are associated primarily, and in some cases exclusively, with one of the possible enantiomers and, therefore, it is desirable and often necessary to resolve the racemate.

A frequently used method, among the known procedures for resolving racemates, employs the difference in properties between the diastereomeric salts obtained upon reaction of a racemic base with an optically active acid. Such procedure comprises mixing the racemate, in an appropriate solvent, with an optically active acid; separation of the diastereomers; and decomposition to the optical isomers of the amine.

Several optically active acids have been found useful for this purpose, among which the most universally employed in industry are camphorsulfonic acid as well as tartaric acid. The recovery of the resolving agents presents an economical problem since they are soluble in water and thus difficult to recover. This necessitates the use of fresh resolving agent for each run, and precludes recycling operations. Furthermore, the known resolving agents have limited applicability.

There is therefore a need for a resolving agent of wide applicability which is commercially available and is insoluble in water. A resolving agent with these properties can be utilized in commercial processes for resolving a wide spectrum of amines, can be regenerated economically, and can be reused.

SUMMARY OF THE INVENTION

The present invention relates to the use of a commercially available organic acid as a resolving agent for a broad spectrum of organic amines containing one or more centers of chirality.

This invention further relates to the use, as a resolving agent for amines, as hereinafter defined, of an organic carboxylic acid which can be readily recovered as a precipitate from aqueous media and which is thus suitable for reuse in commercial operations.

This invention particularly relates to processes whereby optically pure (−)-di-O-isopropylidene-2-keto-L-gulonic acid, also referred to hereinafter as (−)-DAG, is reacted with a racemic modification of an optically active amine to form novel diastereomeric salts. The novel diastereomers are subsequently isolated, either in crystalline or in liquid form, depending on the properties of the compounds.

The crystalline diastereomers can then be separated by fractional crystallization from a suitable solvent. The desired enantiomer of the amine can then be formed by treating the appropriate diastereomer with a base which is stronger than the amine, preferably an alkali metal hydroxide or ammonium hydroxide.

In the case of non-crystalline diastereomers, the separation may be effected by methods such as fractional liquid-liquid extraction, e.g., a Craig countercurrent distribution. In this case, the desired enantiomer of the amine can also be formed by treating the appropriate diastereomer with a base which is stronger than the amine, preferably an alkali metal hydroxide or ammonium hydroxide.

The resulting salt, e.g., alkali metal or ammonium salt of (−)-di-O-isopropylidene-2-keto-1-gulonic acid is water soluble, but its corresponding acid which is insoluble can be readily regenerated by treatment with a mineral acid, preferably concentrated hydrochloric acid, in aqueous medium at low temperatures, e.g., about −5°C. to about 15°C., preferably about 0°C. The (−)-di-O-isopropylidene-2-keto-L-gulonic acid precipitates in high yield and, after separation from the aqueous medium is suitable for reuse.

DETAILED DESCRIPTION OF THE INVENTION

The products formed according to this invention are salts of (−)-DAG with the enantiomers of racemic modifications of optically active amines. The amines suitable for forming salts with (−)-DAG are primary, secondary, or tertiary amines containing at least one chiral center and wherein the amino nitrogen atom is either substituted by, or a part of, aliphatic, heterocyclic, or alicyclic moieties. The aliphatic, heterocyclic, or alicyclic moieties can be further substituted by aliphatic, aromatic, heterocyclic, alicyclic, halogen, hydroxy, trifluoromethyl, nitro alkoxy, and the like. The preferred amines useful in this invention are those in which at least one optical isomer forms a crystalline compound with (−)-DAG. Amines wherein an aromatic moiety is directly substituted on the amino nitrogen are not suitable for this invention. These unsuitable amines are referred to herein as "aromatic amines."

Suitable amines are aralkyl amines, e.g., (±)-α-methylbenzylamine, (±)-α-(1-naphthyl)-ethylamine, D,L-amphetamine, D,L-2-benzylamino-1-propanol, D-,L-threo-1-(p-nitrophenyl)-2-amino-1,3-propanediol, D,L-dopa, and the like.

Other suitable amines are heterocyclic amines, e.g., isoquinolines such as (±)-1-(p-methoxybenzyl)-1,2,3,4,5,6,7,8-octahydroisoquinoline, (±)-1,2,3,4-tetrahydro-7-methoxy-4-phenylisoquinoline, and the like, morphinans such as (±)-3-methoxymorphinan, (±)-3-hydroxy-N-methylmorphinan, and the like.

The optically active amines which are prepared from the salts of this invention have a variety of uses, e.g., they have utility as pharmaceuticals, resolving agents for racemic acids and the like. For example, (+)-3-methoxymorphinan and (+)-3-hydroxy-N-methylmorphinan are anti-tussives; (+)-α-methylbenzylamine is useful as a resolving agent for racemic acids; D-(−)-threo-1-(p-nitrophenyl)-2-amino-1,3-propanediol is useful as an intermediate in the preparation of chloramphenicol; (−)-α-(1-naphthyl)-ethylamine is useful as resolving agent for racemic acids; (−)-1-(p-methoxybenzyl)-1,2,3,4,5,6,7,8-octahydroisoquinoline is useful as an intermediate for the preparation of anti-tussives, e.g., morphinans; (−)-1,2,3,4-tetrahydro-7-methoxy-4-phenylisoquinoline is useful as a hypotensive; and L-dopa is useful in the treatment of Parkinson's disease.

The (−)-DAG amine salts formed according to this invention are thus useful as intermediates in the resolution of racemic amines, exclusive of the aromatic amines as defined supra.

Generally, the salts of this invention are formed by reacting (−)-DAG with the racemic amine. This reaction is effected most readily from about 0°C. to the decomposition temperatures of the reactants, preferably room temperature (about 25°C. to 28°C.) to about 60°C. are utilized. The reactants are mixed in about equimolar amounts and the resulting product consists of a mixture of the optically active amine salts of (−)-DAG. In most cases, at least one of the diastereomeric salts is crystalline and can be isolated by fractional crystallization from a suitable solvent. In those cases wherein the compounds are not crystalline, separation by fractional liquid-liquid extraction is required.

Solvents which are suitable for crystallizing the diastereomers are polar organic solvents, e.g., the lower alkanols, such as methanol, ethanol, propanol and the like; ketones, e.g., acetone; acetonitrile and the like. In some cases non-polar organic solvents, e.g., benzene, are suitable, however, the polar solvents are generally used and are preferred.

In order to facilitate crystallization, it is usually beneficial to seed the solution with crystals of the desired optically pure diastereomer.

The desired enantiomer is finally regenerated from the optically active (−)-DAG amine salt by chemical means, e.g., decomposition. This is accomplished by treatment with a base which is stronger than the amine, preferably an alkali metal hydroxide, e.g., NaOH, KOH, is utilized. Concentrated $NH_4OH$ as well as other bases are also suitable. Generally, a base at a concentration of about 1–5 N and at reaction temperatures of about 0°C.–100°C. is suitable. It is preferred to use about 2 N sodium hydroxide at room temperature (25°C. to 28°C.). The salt of (−)-DAG which is thus formed remains in aqueous solution until it is treated with a mineral acid, whereupon the free acid forms and precipitates.

The more soluble remaining diastereomer can be isolated from the mother liquors by removal of the solvent. Decomposition of the residue with a base affords the corresponding free amine which is then extracted with an organic solvent while the salt of (−)-DAG remains in aqueous solution. The (−)-DAG is readily precipitated by treating the aqueous solution with a mineral acid.

The (−)-DAG utilized in this invention is obtained in optically pure form as an intermediate of vitamin C synthesis and can be prepared according to the process described by Reichstein et al., in Helv. 17, 311 (1934).

The following examples illustrate the invention which is not limited to the specific embodiments shown. All temperatures are in °C.

EXAMPLE 1

(a) Preparation of (+)-α-methylbenzylamine (−)-di-O-isopropylidene-2-keto-L-gulonate 18.0 g. (150 mmoles) (±)-α-methylbenzylamine were dissolved in 200 ml. of hot methanol and combined, in a well agitated flask immersed in a temperature controlled water bath, with a hot solution of 45.0 g. (154 mmoles) of (−)-di-O-isopropylidene-2-keto-L-gulonic acid hydrate in 200 ml. of methanol. The resulting solution was seeded with a few crystals of (+)-α-methylbenzylamine (−)-di-O-isopropylidene-2-keto-L-gulonate (prepared by 1:1 additon of (+)-α-methylbenzylamine and (−)-di-O-isopropylidene-2-keto-L-gulonate) and stirred while the temperature was allowed to drop slowly from 64° to room temperature over a period of 18 hours. The crystals then were collected by filtration, washed with a little cold methanol and dried. The resulting crude (+)-α-methylbenzylamine (−)-di-O-isopropylidene-2-keto-L-gulonate had a m.p. 223°–225° (dec.), $[\alpha]_D^{25}$ −15.1° (c. 1.03, MeOH). Two crystallizations from 90 percent aqueous ethanol (400 ml.), under the same conditions as mentioned above gave analytically pure (+)-α-methylbenzylamine (−)-di-O-isopropylidene- 2-keto-L-gulonate, m.p. 228°–229° (dec.), $[\alpha]_D^{25}$ −15.0° (c 1.00, MeOH).

b. Conversion of (+)-α-methylbenzylamine (−)-di-O-isopropylidene-2-keto-L-gulonate to (+)-α-methylbenzylamine and (−)-di-O-isopropylidene-2-keto-L-gulonic acid 22.3 g. (56 mmoles) of (+)-α-methylbenzylamine (−)-di-O-isopropylidene-2-keto-L-gulonate (prepared as in Example 1a) were added to 40 ml. of 2 N sodium hydroxide which had been preheated to 60°. The resulting suspension was cooled to room temperature and twice extracted with ether (2 × 150 ml.). The combined ether solutions were dried over magnesium sulfate and the solvent removed under reduced pressure. The residue was distilled (b.p. 116°–117°/90 mm.) to give (+)-α-methylbenzylamine, $[\alpha]_D^{25}$ +34.82° (neat). (−)-Di-O-isopropylidene-2-keto-L-gulonic acid was recovered almost quantitatively by precipitation from the aqueous extract with concentrated hydrochloric acid at about 0°.

c. Recovery of (−)-α-methylbenzylamine

The filtrates obtained in the preparation of (+)-α-methylbenzylamine (−)-di-O-isopropylidene-2-keto-L-gulonate (according to the procedure in Example 1a) were concentrated to dryness and the residue was treated with 200 ml. of 2 N sodium hydroxide. The resulting suspension was extracted with ether (3 × 200 ml.). The combined ether solutions were dried over magnesium sulfate and the solvent was removed under reduced pressure to give (−)-α-methylbenzylamine, $[\alpha]_D^{25}$ −20.8° (neat). (−)-Di-O-isopropylidene-2-keto-L-gulonic acid was recovered from the aqueous extract by treatment with concentrated hydrochloric acid at about 0°.

d. Preparation of (−)-α-methylbenzylamine (−)-di-O-isopropylidene-2-keto-L-gulonate A mixture of (−)-α-methylbenzylamine (242 mg.), (−)-di-O-isopropylidene-2-keto-L-gulonic acid hydrate (584 mg.) and acetone (3.5 ml.) were heated on a steambath until a homogeneous solution was obtained. The reaction mixture was allowed to cool to room temperature to precipitate (−)-α-methylbenzylamine (−)-di-O-isopropylidene-2-keto-L-gulonate, m.p. 213°–218°, $[\alpha]_D^{25}$ −18.6° (c 1.16, MeOH).

EXAMPLE 2 a. Preparation of D-(−)-threo-1-(p-nitrophenyl)-2-amino-1,3-propanediol (−)-di-O-isopropylidene-2-keto-L-gulonate 8.4 g. (40 mmoles) of D,L-threo-1-(p-nitrophenyl)-2-amino-1,3-propanediol and 11.6 g. (40 mmoles) of (−)-di-O-isopropylidene-2-keto-L-gulonic acid hydrate were dissolved in 200 ml. of alcohol (95 percent) by heating on a steambath. The solution was seeded with a few crystals of D-(−)-threo-1-(p-nitrophenyl)-2-amino-1,3-propanediol (−)-di-O-isopropylidene-2-keto-L-gulonate (prepared by 1:1 addition). Undisturbed cooling to room temperature for 3 hours yielded the crude salt, m.p. 191°–193°, $[\alpha]_D^{25}$ −13.6° (c 1.09, MeOH). The crude product after two crystallizations from 150 ml. of ethanol (95 percent) yielded pure D-(−)-threo-1-(p-nitrophenyl)-2-amino-1,3-propanediol (−)-di-O-isopropylidene-2-keto-L-gulonate, m.p. 199–201°, $[\alpha]_D^{25}$ −23.3° (c 1.13, MeOH).

b. Conversion of
D-(−)-threo-1-(p-nitrophenyl)-2-amino-1,3-propanediol
(−)-di-O-isopropylidene-2-keto-L-gulonate to
D-(−)-threo-1-(p-nitrophenyl)-2-amino-1,3,-propanediol 2.3 g. (4.75 mmoles) of D-(−)-threo-1-(p-nitrophenyl)-2-amino-1,3-propanediol (−)-di-O-isopropylidene-2-keto-L-gulonate in 25 ml. of water was treated with concentrated ammonium hydroxide (pH~10) to decompose the salt. The resulting base which precipitated was separated by filtration. Recrystallization from 15 ml. of hot water yielded D-(−)-threo-1-(p-nitrophenyl)-2-amino-1,3-propanediol, m.p. 162°–164°, $[\alpha]_D^{25}$ −21.8° (c 1.55, MeOH).

c. Isolation of
L-(+)-threo-1-(p-nitrophenyl)-2-amino-1,3-propanediol
(−)-di-O-isopropylidene-2-keto-L-gulonate The combined mother liquors obtained in the preparation of D-(−)-threo-1-(p-nitrophenyl)-2-amino-1,3-propanediol (−)-di-O-isopropylidene-2-keto-L-gulonate were concentrated to a volume of about 140 ml. Undisturbed cooling overnight yielded L-(+)-threo-1-(p-nitrophenyl)-2-amino-1,3,-propanediol (−)-di-O-isopropylidene-2-keto-L-gulonate as fine needles. Several recrystallizations from ethanol afforded L-(+)-threo-1-(p-nitrophenyl)-2-amino-1,3-propanediol (−)-di-O-isopropylidene-2-keto-L-gulonate, m.p. 191°–194°, $[\alpha]_D^{25}$ −2.8° (c 1.25, MeOH).

d. Conversion of
L-(+)-threo-1-(p-nitrophenyl)-2-amino-1,3-propanediol
(−)-di-O-isopropylidene-2-keto-L-gulonate to
L-(+)-threo-1-(p-nitrophenyl)-2-amino-1,3-propanediol 2.0 g. (4.1 mmoles) of L-(+)-threo-1-(p-nitrophenyl)-2-amino-1,3-propanediol (−)-di-O-isopropylidene-2-keto-L-gulonate in 15 ml. of water was treated with concentrated ammonium hydroxide (pH~10) to decompose the amine salt. The resulting base which precipitated was separated by filtration. Recrystallization from 10 ml. of water yielded pure L-(+)-threo-1-(p-nitrophenyl)-2-amino-1,3-propanediol, m.p. 162°–164°, $[\alpha]_D^{25}$ +21.8° (c 1.48, MeOH). The (−)-DAG was precipitated by treating the aqueous solution of the ammonium salt with concentrated hydrochloric acid at about 0°.

EXAMPLE 3 a. Resolution of (±)-α-(1-naphthyl)ethylamine 10 g. (59 mmoles) of (±)-α-(1-naphthyl)ethylamine were dissolved in 500 ml. of hot acetone and combined with a hot solution of 17.1 g. (59 mmoles) of (−)-di-O-isopropylidene-2-keto-L-gulonic acid hydrate in 500 ml. of acetone. The resulting solution was seeded with (−)-α-(1-naphthyl)ethylamine (−)-di-O-isopropylidene-2-keto-L-gulonate and then allowed to stand at room temperature for 40 minutes. The resulting crystals were collected by filtration, washed with acetone and dried, yielding the crude salt, m.p. 213°–215°, $[\alpha]_D^{25}$ −15.2° (c 1.14, MeOH). Two recrystallizations from acetone (with seeding) yielded pure (−)-α-(1-naphthyl)ethylamine (−)-di-O-isopropylidene-2-keto-L-gulonate, m.p. 223°–224°, $[\alpha]_D^{25}$ −18.1° (c 1.04, MeOH).

b. Converson of (−)-α-(1-naphthyl)ethylamine
(−)-di-O-isopropylidene-2-keto-L-gulonate to
(−)-α-(1-naphthyl)ethylamine 4.5 g. (10 mmoles) of (−)-α-(1-naphthyl)ethylamine (−)-di-O-isopropylidene-2-keto-L-gulonate were added to 2 N sodium hydroxide which had been preheated to 60°. The resulting suspension was cooled to room temperature and extracted with ether. The combined ether solutions were dried over magnesium sulfate and the solvent was removed under reduced pressure. The residue was distilled (b.p. 156°–158°/15 mm.) to give pure (−)-α-(1-naphthyl)ethylamine, $[\alpha]_D^{25}$ −79.57° (neat); $[\alpha]_D^{25}$ −59.5° (c 5.09, MeOH).

c. Preparation of (+)-α-(1-naphthyl)ethylamine
(−)-di-O-isopropylidene-2-keto-L-gulonate 342 gm. of (+)-α-(1-naphthyl)ethylamine and 584 mg. of (−)-di-O-isopropylidene-2-keto-L-gulonic acid hydrate were dissolved in a minimum of hot acetone and allowed to cool to room temperature to yield a precipitate of (+)-α-(1-naphthyl) ethylamine (−)-di-O-isopropylidene-2-keto-L-gulonate, m.p. 212°–214°, $[\alpha]_D^{25}$ −9.35° (c 1.07, MeOH).

EXAMPLE 4 a. Preparation of
(−)-1-(p-methoxybenzyl)-1,2,3,4,5,6,7,8-octahydroisoquinoline
(−)-di-O-isopropylidene-2-keto-L-gulonate 250.0 g. crude racemic 1-(p-methoxybenzyl)-1,2,3,4,5,6,7,8-octahydroisoquinoline (0.972 mols) were dissolved in 500.0 ml. acetonitrile and the solution heated to 70°. 305.0 g. (−)-di-O-isopropylidene-2-keto-L-gulonic acid hydrate (1.04 mols) were dissolved in 1500.0 ml. acetonitrile and the solution heated to 70°. The two hot solutions then were added together with vigorous agitation and seeded with 100 mg. of (−)-1-(p-methoxybenzyl)-1,2,3,4,5,6,7,8-octahydroisoquinoline (−)-di-O-isopropylidene-2-keto-L-gulonate. The temperature of the reaction mixture was allowed to drop slowly from 70° to 45° in 7 hours and from 45° to 23° in 15 hours. Total reaction time was 22 hours. Vigorous agitation was maintained for the entire 22-hour period. After 22 hours, the resulting crystals were isolated by filtration and washed on the filter with 500 ml. cold acetonitrile (5°). After washing, the crystals were dried in a vacuum oven at 60° to constant weight. A drying period of 20 hours was required. A crude salt containing about 92.4 percent of (−)-1-(p-methoxybenzyl)-1,2,3,4,5,6,7,8-octahydroisoquinoline (−)-di-O-isopropylidene-2-keto-L-gulonate, $[\alpha]_D^{20}$ −63.3 . (C 2, MeOH) was obtained. 20.0 g. of the crude salt were recrystallized twice by dissolving each time in 250.0 ml. boiling acetonitrile and by cooling slowly to room temperature with good agitation. Crystals were isolated by filtration and washed on the filter with 50.0 ml. cold acetonitrile (5°). The crystals were dried in a vacuum oven at 60° for 20 hours to constant weight to yield (−)-1-(p-methoxybenzyl)-1,2,3,4,5,6,7,8-octahydroisoquinoline (−)-di-O-isopropylidene-2-keto-L-gulonate, $[\alpha]_D^{20}$ −73.2 (c 2, MeOH).

b. Conversion of
(−)-1-(p-methoxybenzyl)-1,2,3,4,5,6,7,8-octahydroisoquinoline
(−)-di-O-isopropylidene-2-keto-L-gulonate to
(−)-1-(p-methoxybenzyl)-1,2,3,4,5,6,7,8-octahydroisoquinoline 154.4 g. (0.290 mole) of (−)-1-(p-methoxybenzyl)-1,2,3,4,5,6,7,8-octahydroisoquinoline (−)-di-O-isopropylidene-2-keto-L-gulonate were slowly added to 200 ml. of 2N sodium hydroxide which had been preheated to 60°. The resulting suspension was cooled to room temperature and twice extracted with ether (750 ml.). The combined ether solutions were washed with 100 ml. of 1N sodium hydroxide, then with water (2 × 100 ml.), dried over magnesium sulfate and the solvent removed under reduced pressure yielding (−)-1-(p-methoxybenzyl)-1,2,3,4,5,6,7,8-octahydroisoquinoline, $[\alpha]_D^{25}$ −144° (c 1.06, MeOH). A second sample of the (−)-base was distilled, b.p. 138°–141°/0.03 mm., $[\alpha]_D^{25}$ −144° (c 2.01, MeOH). The aqueous mother liquors containing the sodium salt of (−)-DAG was separated from the organic layer, cooled to 15° and made acid to pH 2.0 by the addition of 200 ml. of concentrated hydrochloric acid. The resulting precipitate of (−)-DAG was separated by filtration and dried.

c. Isolation of
(+)-1-(p-methoxybenzyl)-1,2,3,4,5,6,7,8-octahydroisoquinoline
(−)-di-O-isopropylidene-2-keto-L-gulonate The mother liquors obtained in the preparation of (−)-1-(p-methoxybenzyl)-1,2,3,4,5,6,7,8-octahydroisoquinoline (−)-di-O-isopropylidene-2-keto-L-gulonate were concentrated to about one half of the original volume and allowed to stand at 0° for 86 hours. The crude (+)-amine salt which crystallized was collected by filtration and dried. Three crystallizations from isopropanol-ethyl acetate (2:1) yielded pure (+)-1-(p-methoxybenzyl)-1,2,3,4,5,6,7,8-octahydroisoquinoline (−)-di-O-isopropylidene-2-keto-L-gulonate, m.p. 167–168°, $[\alpha]_D^{25}$ +47.1° (c 1, MeOH).

d. Conversion of
(+)-1-(p-methoxybenzyl)-1,2,3,4,5,6,7,8-octahydroisoquinoline
(−)-di-O-isopropylidene-2-keto-L-gulonate to
(+)-1-(p-methoxybenzyl)-1,2,3,4,5,6,7,8-octahydroisoquinoline 0.500 g. (1 mmole) of (+)-1-(p-methoxybenzyl)-1,2,3,4,5,6,7,8-octahydroisoquinoline (−)-di-O-isopropylidene-2-keto-L-gulonate in 10 ml. of water was decomposed by treatment with concentrated ammonium hydroxide (pH∼10) to form a suspension which was then extracted with ether (3 × 6 ml.). The combined ether solutions were washed with water, dried over magnesium sulfate and the solvent was removed under reduced pressure thus affording crude (+)-1-(p-methoxybenzyl)-1,2,3,4,5,6,7,8-octahydroisoquinoline. A sample of this compound was distilled, b.p. 139°–140°/0.025 mm., $[\alpha]_D^{25}$ +148° (c 2.02, MeOH).

The aqueous mother liquor containing the ammonium salt of (−)-DAG was acidified with concentrated hydrochloric acid at about 10°. The resulting precipitate of (−)-DAG was recovered by filtration.

EXAMPLE 5 a. Preparation of
(−)-1-(p-methoxybenzyl)-1,2,3,4,5,6,7,8-octahydroisoquinoline
(−)-di-O-isopropylidene-2-keto-L-gulonate 69.0 gm. (0.268 mole) of (l)-1-(p-methoxybenzyl)-1,2,3,4,5,6,7,8-octahydroisoquinoline was dissolved in 756 ml. of hot acetonitrile and combined with a hot solution of 75 gm. (0.26 mole) of (−)-di-O-isopropylidene-2-keto-L-gulonic acid hydrate in 756 ml. of acetonitrile in a well agitated, temperature controlled flask, immersed in a water bath equipped with an immersion heater. The resulting solution was seeded with (−)-1-(p-methoxybenzyl)-1,2,3,4,5,6,7,8-octahydroisoquinoline (−)-di-O-isopropylidene-2-keto-L-gulonate and stirred well while the temperature was allowed to drop to 23° over a period of 25 hours. The resulting crystals were then collected by filtration, washed with acetonitrile and dried, yielding a crude (−)-amine salt, m.p. 174°–176°, $[\alpha]_D^{25}$ −62.3° (c 1, MeOH). The crude salt was recrystallized four times from acetonitrile with stirring and slow cooling to yield pure (−)-1-(p-methoxybenzyl)-1,2,3,4,5,6,7,8-octahydroisoquinoline (−)-di-O-isopropylidene-2-keto-L-gulonate, m.p. 181°–182°, $[\alpha]_D^{25}$ −73,5° (c 1, MeOH).

b. Conversion of
(−)-1-(p-methoxybenzyl)-1,2,3,4,5,6,7,8-octahydroisoquinoline
(−)-di-O-isopropylidene-2-keto-L-gulonate to
(−)-1-(p-methoxybenzyl)-1,2,3,4,5,6,7,8-octahydroisoquinoline The product from Example 5(a) was treated following the procedures of Example 4(b), to yield (−)-1-(p-methoxybenzyl)-1,2,3,4,5,6,7,8,-octahydroisoquinoline, b.p. 138°–141°/0.03 mm., $[\alpha]_D^{25}$ −144° (c 2.01, MeOH). The resolving agent (−)-DAG was recovered in the manner described in Example 4(b).

c. Isolation of
(+)-1-(p-methoxybenzyl)-1,2,3,4,5,6,7,8-octahydroisoquinoline
(−)-di-O-isopropylidene-2-keto-L-gulonate The mother liquors resulting from Example 5(a) were treated following the procedures of Example 4(c) to yeild (+)-1-(p-methoxybenzyl)-1,2,3,4,5,6,7,8-octahydroisoquinoline (−)-di-O-isopropylidene-2-keto-L-gulonate, m.p. 167°–168°, $[\alpha]_D^{25}$ +47.1°, (c 1, MeOH).

d. Conversion of (+)-1-(p-methoxybenzyl)-1,2,3,4,5,6,7,8-octahydroisoquinoline (−)-di-O-isopropylidene-2-keto-L-gulonate to (+)-1-(p-methoxybenzyl)-1,2,3,4,5,6,7,8-octahydroisoquinoline The product of Example 5(c) was treated following the procedures of Example 4(d) to yield (+)-1-(p-methoxybenzyl)-1,2,3,4,5,6,7,8-octahydroisoquinoline, b.p. 139– °/0.025 mm., $[\alpha]_D^{25}$ +148° (c 2.02, MeOH).

EXAMPLE 6 a. Preparation of (+)-3-methoxymorphinan (−)-di-o-isopropylidene-2-keto-L-gulonate A mixture of 10 g. (39 mmoles) of (±)-3-methoxymorphinan, 12 g. (40 mmoles), (−)-di-O-isopropylidene-2-keto-L-gulonic acid hydrate and 40 ml. of benzene was heated on a steambath to solution, seeded with a few crystals of (+)-3-methoxymorphinan (−)-di-O-isopropylidene-2-keto-L-gulonate and then allowed to stand at room temperature for 3 days. The resulting precipitate was filtered and dried, yielding crude (+)-3-methoxymorphinan (−)-di-O-isopropylidene-2-keto-L-gulonate. The product was recrystallized twice from benzene-hexane (80 ml.; 1:1) to give pure (+)-3-methoxymorphinan (−)-di-O-isopropylidene-2-keto-L-gulonate, m.p. 186°–188°, $[\alpha]_D^{25}$ +4.52 (c 1.04, MeOH).

b. Conversion of (+)-3-methoxymorphinan (−)-di-O-isopropylidene-2-keto-L-gulonate to (+)-3-methoxymorphinan 6.4 g. (12 mmoles) of (+)-3-methoxymorphinan (−)-di-O-isopropylidene-2-keto-L-gulonate were added to 30 ml. of 2 N sodium hydroxide which had been preheated to 60°. The resulting suspension was cooled to room temperature and extracted with methylene chloride (2 × 100 ml.). The combined methylene chloride solutions were dried over sodium sulfate and the solvent was removed under reduced pressure. The residue was distilled (b.p. 142°–150°/0.05 mm.) to yield (+)-3-methoxymorphinan, $[\alpha]_D^{25}$ +31.2° (c 2.12, MeOH). The aqueous mother liquor containing the sodium salt of (−)-DAG was acidified with concentrated hydrochloric acid at 10°. The resulting precipitate of (−)-DAG was recovered by filtration.

EXAMPLE 7 a. Preparation of 2-benzyl-1,2,3,4-tetrahydro-7-methoxy-4-phenyl-4-isoquinolinol hydrochloride To 3 g. of dry magnesium turnings covered with 20 ml. of anhydrous tetrahydrofuran, 22 g. of bromobenzene in 20 ml. of anhydrous tetrahydrofuran were added. Stirring and gentle refluxing were continued for an hour to complete the formation of the Grignard reagent. Thereafter, a solution containing 25 g. of 2-benzyl-2,3-dihydro-7-methoxy-4(1 H)-isoquinolone in 200 ml. of anhydrous tetrahydrofuran was added. After 2 hours at reflux, the reaction mixture was cooled, poured into an ice-cold saturated solution of ammonium chloride and extracted several times with ether. The residue was dissolved in ether and the insoluble portion was removed by filtration. After treating the filtrate with an excess of isopropanolic hydrogen chloride, crystalline 2-benzyl-1,2,3,4-tetrahydro-7-methoxy-4-phenyl-4-isoquinolinol hydrochloride was obtained, melting point 206°–208°.

b. Preparation of (±)-1,2,3,4-tetrahydro-7-methoxy-4-phenylisoquinoline

To a solution containing 5.6 g. of 2-benzyl-1,2,3,4-tetrahydro-7-methoxy-4-phenyl-4-isoquinolinol in 120 ml. of glacial acetic acid was added 0.8 g. of 10 percent palladium-on-charcoal catalyst. The mixture was hydrogenated at 60° and 50 psi for 15 hours. Thereafter, the catalyst was removed by filtration and the filtrate was evaporated to dryness under reduced pressure, to yield (±)-1,2,3,4-tetrahydro-7-methoxy-4-phenylisoquinoline.

c. Resolution of (±)-1,2,3,4,-tetrahydro-7-methoxy-4-phenylisoquinoline

A mixture of 16.6 g. (70 mmoles) of (±)-1,2,3,4-tetrahydro-7-methoxy-4-phenylisoquinoline, 20.3 g. (70 mmoles) of (−)-di-O-isopropylidene-2-keto-L-gulonic acid hydrate and 60 ml. of ethanol (95 percent) was heated on a steambath until solution occurred. Undisturbed cooling overnight yielded 16.6 g. (32 mmoles) of crude salt, mp. 169°–171°, $[\alpha]_D^{25}$ −14.6° (c 1.02, MeOH). The product was recrystallized from ethyl acetate (400 ml.) to yield pure (−)-1,2,3,4-tetrahydro-7methoxy-4-phenylisoquinoline (−)-di-O-isopropylidene-2-keto-L-gulonate, m.p. 172°–174°, $[\alpha]_D^{25}$ −16.8° (c 1.08, MeOH).

d. Conversion of (−)-1,2,3,4-tetrahydro-7-methoxy-4-phenylisoquinoline (−)-di-O-isopropylidene-2-keto-L-gulonate to (−)-1,2,3,4-tetrahydro-7-methoxy-4-phenylisoquinoline 3.1 g. (6 mmoles) of (−)-1,2,3,4-tetrahydro-7-methoxy-4-phenylisoquinoline (−)-di-O-isopropylidene-2-keto-L-gulonate in 20 ml. of water was decomposed by treatment with concentrated ammonium hydroxide. The resulting suspension was extracted with chloroform (3 × 20 ml.) and the combined extracts were dried. Removal of the solvent yielded (−)-1,2,3,4-tetrahydro-7-methoxy-4-phenylisoquinoline, $[\alpha]_D^{25}$ −8.75 (c 1.02, MeOH).

A sample of the above free base, 1.0 g. (4 mmoles), on treatment with hydrogen chloride (anhydrous) in ether afforded the crude hydrochloride. Recrystallization from ethanol yielded pure (−)-1,2,3,4-tetrahydro-7-methoxy-4-phenylisoquinoline hydrochloride, m.p. 237–239°, $[\alpha]_D^{25}$ −15.4° (c 1.01, MeOH).

e. Preparation of (+)-1,2,3,4-tetrahydro-7-methoxy-4-phenylisoquinoline

The filtrates obtained in the preparation of (−)-1,2,3,4-tetrahydro-7-methoxy-4-phenylisoquinoline (−)-di-O-isopropylidene-2-keto-L-gulonate were concentrated to dryness. The residue was suspended in water and treated with concentrated ammonium hydroxide. The resulting suspension was extracted with ether and the combined extracts were dried over magnesium sulfate. Removal of the solvent yielded (42 mmoles) of crude (+)-1,2,3,4-tetrahydro-7-methoxy-4-phenylisoquinoline.

The aqueous mother liquor containing the ammonium salt of (−)-DAG was acidified with concentrated hydrochloride at 10°. The resulting precipitate of (−)-DAG was recovered by filtration.

EXAMPLE 8 a. Resolution of (±)-3-hydroxy-N-methylmorphinan

A mixture of 1.9 g. (7.3 mmoles) of (±)-3-hydroxy-N-methylmorphinan, 2.2 g. (7.5 mmoles) of (−)-di-O-isopropylidene-2-keto-L-gulonic acid hydrate and 10 ml. of ethanol was heated on a steam bath until solution occurred, then seeded with a few crystals of (+)-3-hydroxy-N-methylmorphinan (−)-di-O-isopropylidene-2-keto-L-gulonate and allowed to cool to room temperature. After 24 hours, the resulting crystals were collected by filtration, washed with ethanol and dried, thus affording the crude salt, m.p. 260° (dec.), $[\alpha]_D^{25}$ +9.5° (c 1.02, MeOH). Recrystallization from isopropanol yielded pure (+)-3-hydroxy-N-methylmorphinan (−)-di-O-isopropylidene-2-keto-L-gulonate, m.p. 261° (dec.), $[\alpha]_D^{25}$ +10.0° (c 1.03, MeOH).

b. Conversion of (+)-3-hydroxy-N-methylmorphinan (−)-di-O-isopropylidene-2-keto-L-gulonate to (+)-3-hydroxy-N-methylmorphinan 800 mg. (1.5 mmoles) of (+)-3-hydroxy-N-methylmorphinan (−)-di-O-isopropylidene-2-keto-L-gulonate in 20 ml. of water was decomposed by treatment with concentrated ammonium hydroxide. The resulting suspension was extracted with chloroform (3 × 17 ml.) and the combined extracts were dried. Removal of the solvent yielded crude (+)-3-hydroxy-N-methylmorphinan. Recrystallization from benzene yielded pure (+)-3-hydroxy-N-methylmorphinan in the form of a benzene solvate, m.p. 201°–203° $[\alpha]_D^{25}$ +54.7° (c 1.01, MeOH), undepressed in admixture with an authentic sample.

EXAMPLE 9 a. Resolution of DL-2-benzylamino-1-propanol 18.9 g. (65 mmoles) of (−)-di-O-isopropylidene-2-keto-L-gulonic acid hydrate in 160 ml. of hot ethyl acetate were combined with 10 g. (61 mmoles) of DL-2-benzylamino-1-propanol on a steam bath. The solution was seeded with a few crystals of L-2-benzylamino-1-propanol (−)-di-O-isopropylidene-2-keto-L-gulonate. Undisturbed cooling at room temperature for 6 hours yielded the crude salt. The crude product, after two crystallizations from ethyl acetate, yielded pure L-2-benzylamino-1-propanol (−)-di-O-isopropylidene-2-keto-L-gulonate, m.p. 170°–171°, $[\alpha]_D^{25}$ −10.6° (c 1.02, MeOH).

b. Conversion of L-2-benzylamino-1-propanol (−)-di-O-isopropylidene-2-keto-L-gulonate to L-2-benzylamino-1-propanol 2.0 g. (12 mmoles) of L-2-benzylamino-1-propanol (−)-di-O-isopropylidene-2-keto-L-gulonate were dissolved in 10 ml. of water and decomposed with concentrated ammonium hydroxide. The amine was extracted with chloroform. The chloroform solution was dried over anhydrous magnesium sulfate and the solvent was removed under reduced pressure to yield L-2-benzylamino-1-propanol, m.p. 46°–48°, $[\alpha]_D^{25}$ +39.8° (c 1.02, MeOH).

The aqueous mother liquor containing the ammonium salt of (−)-DAG was acidified with concentrated hydrochloric acid at 0°. The resulting precipitate of (−)-DAG was recovered by filtration.

We claim:
1. (+)-α-methylbenzylamine (−)-di-O-isopropylidene-2-keto-L-gulonate.
2. (−)-α-methylbenzylamine (−)-di-O-isopropylidene-2-keto-L-gulonate.
3. (−)-α-(1-naphthyl)-ethylamine (−)-di-O-isopropylidene-2-keto-L-gulonate.
4. D-(−)-threo-1-(p-nitrophenyl)-2-amino-1,3-propanediol (−)-di-O-isopropylidene-2-keto-L-gulonate.
5. L-(+)-threo-1-(p-nitrophenyl)-2-amino-1,3-propanediol (−)-di-O-isopropylidene-2-keto-1-gulonate.

* * * * *